May 26, 1942.　　　P. R. POWELL　　　2,284,019
LABELING APPARATUS
Filed March 16, 1940　　　9 Sheets-Sheet 9
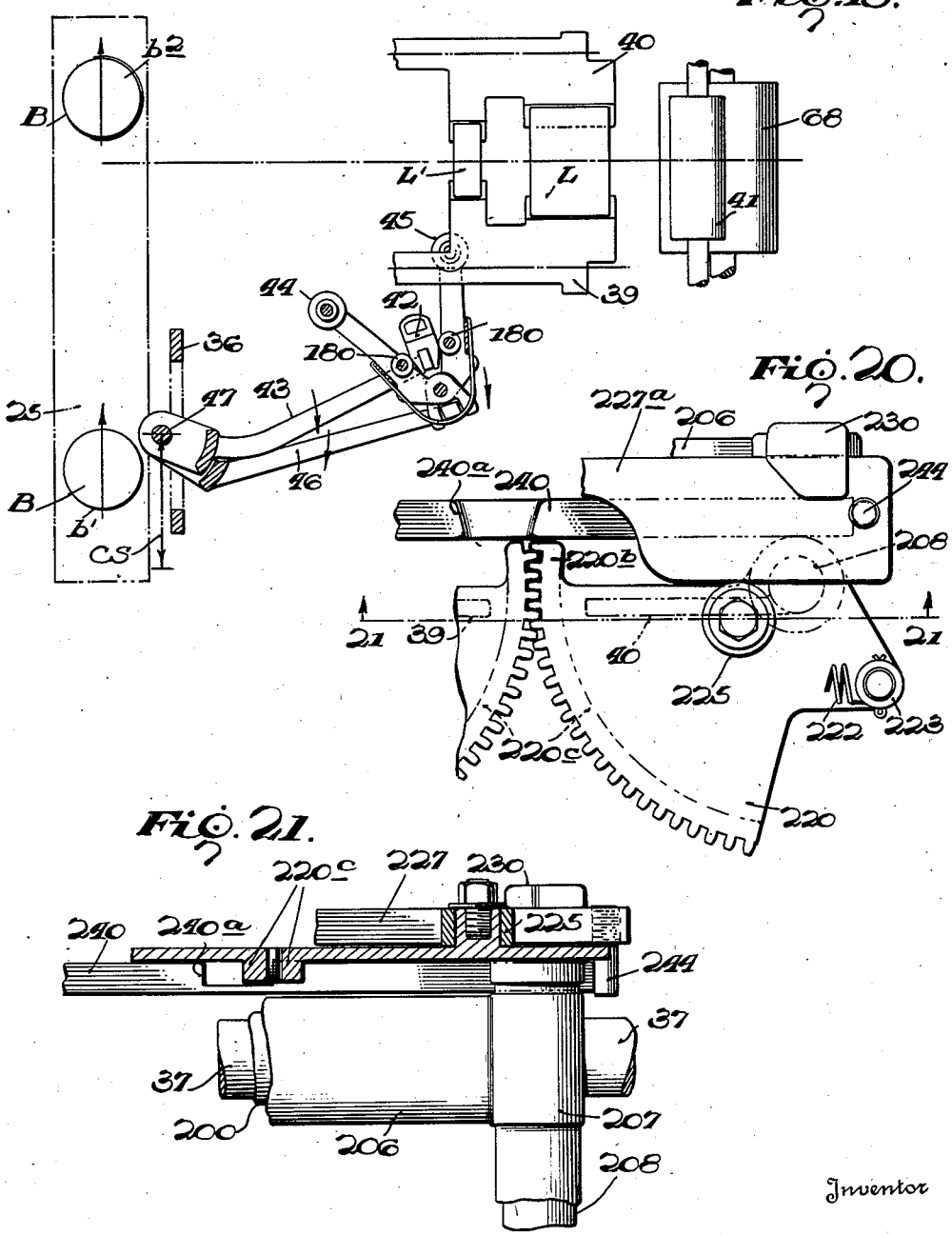
Inventor
Paul R. Powell.
By Cushman, Darby & Cushman
Attorneys Patented May 26, 1942

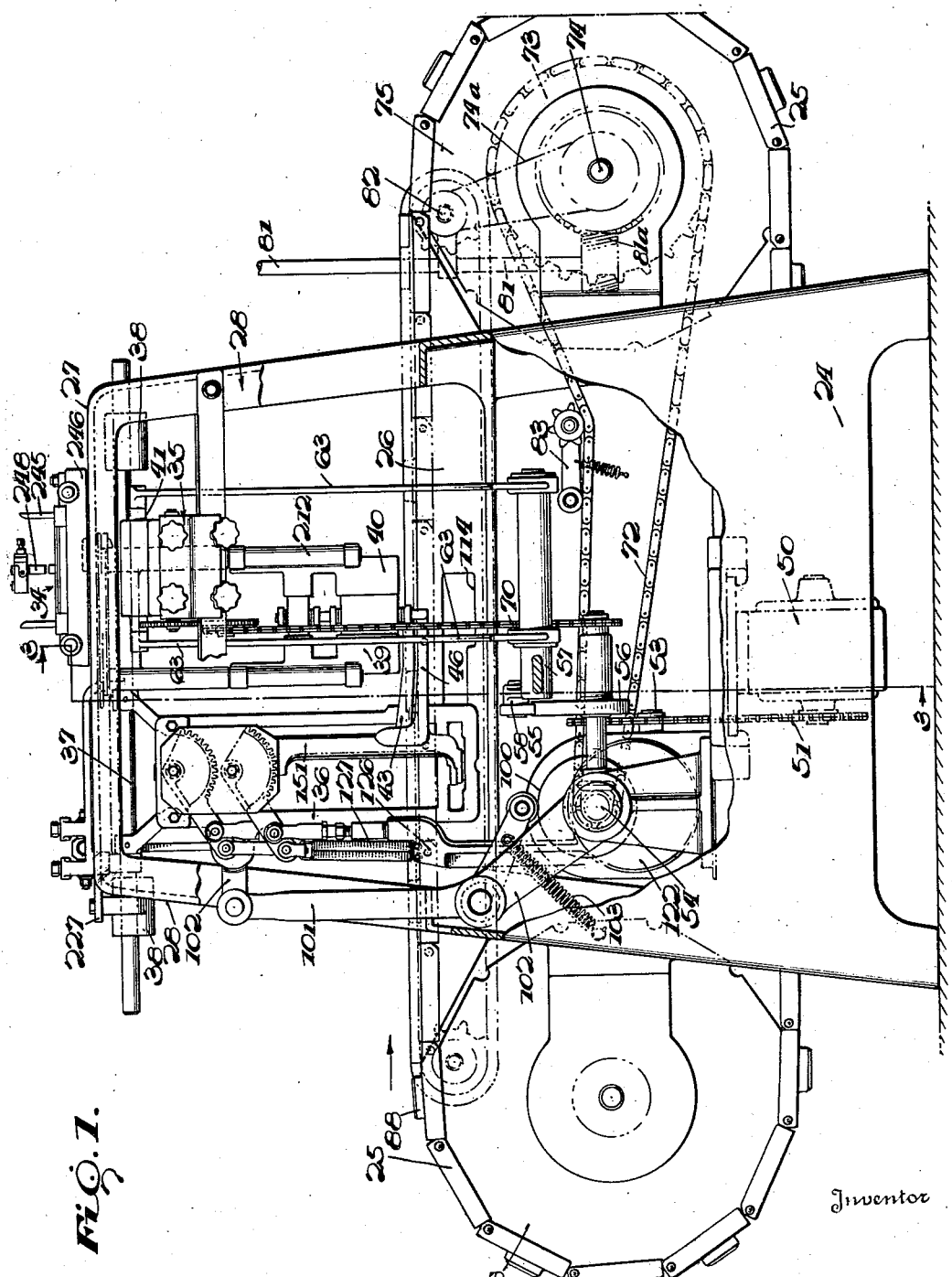

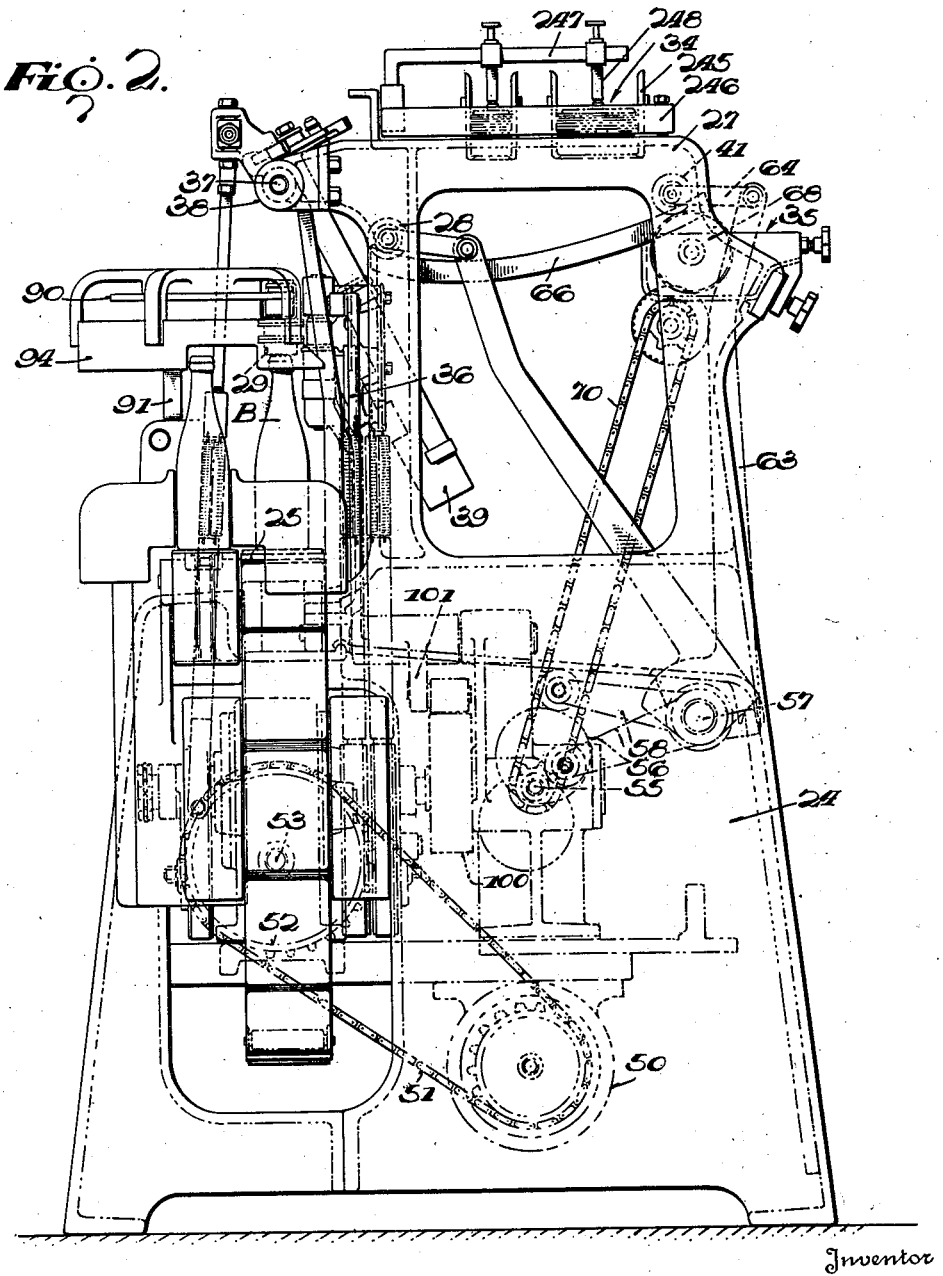

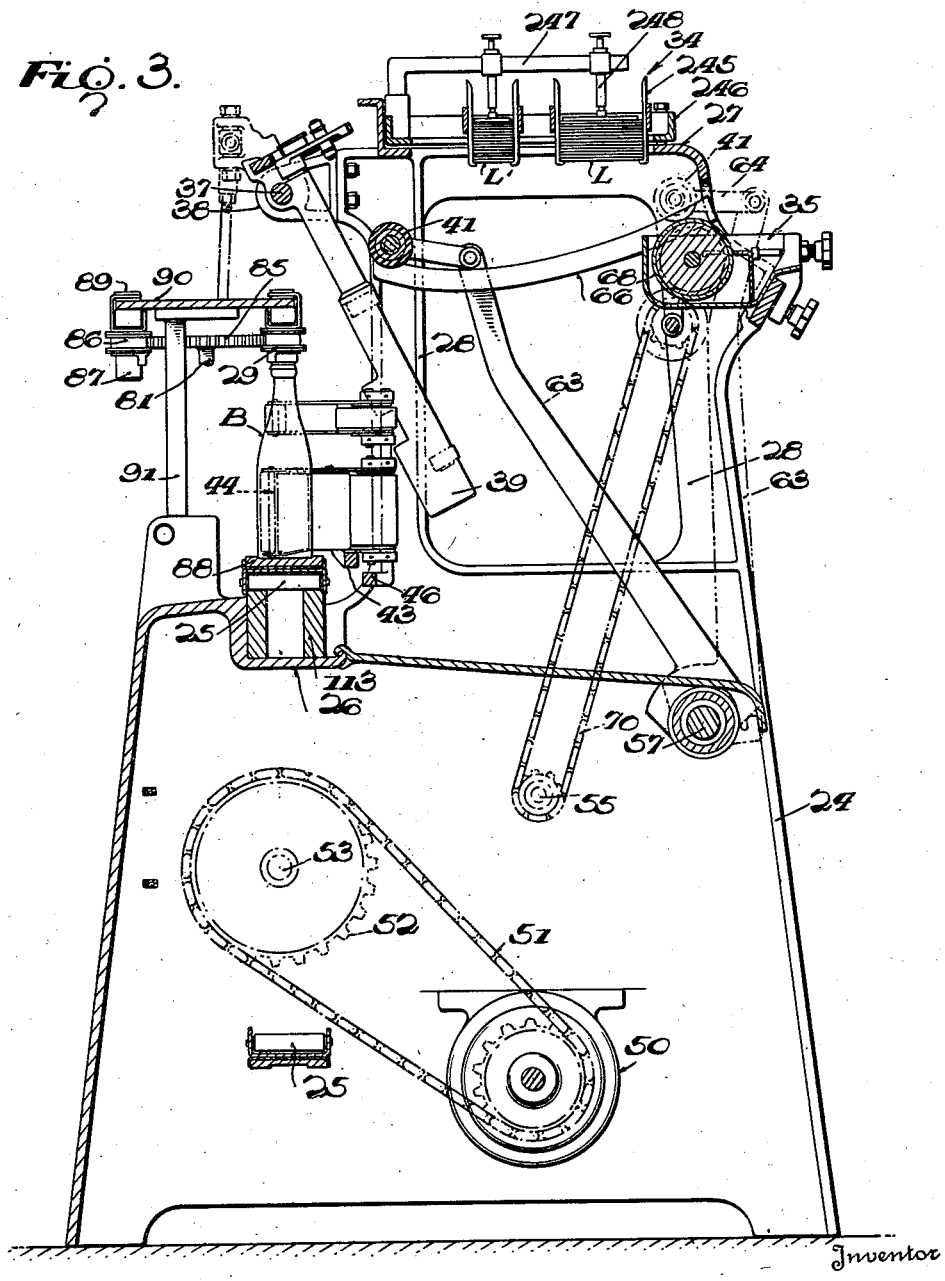

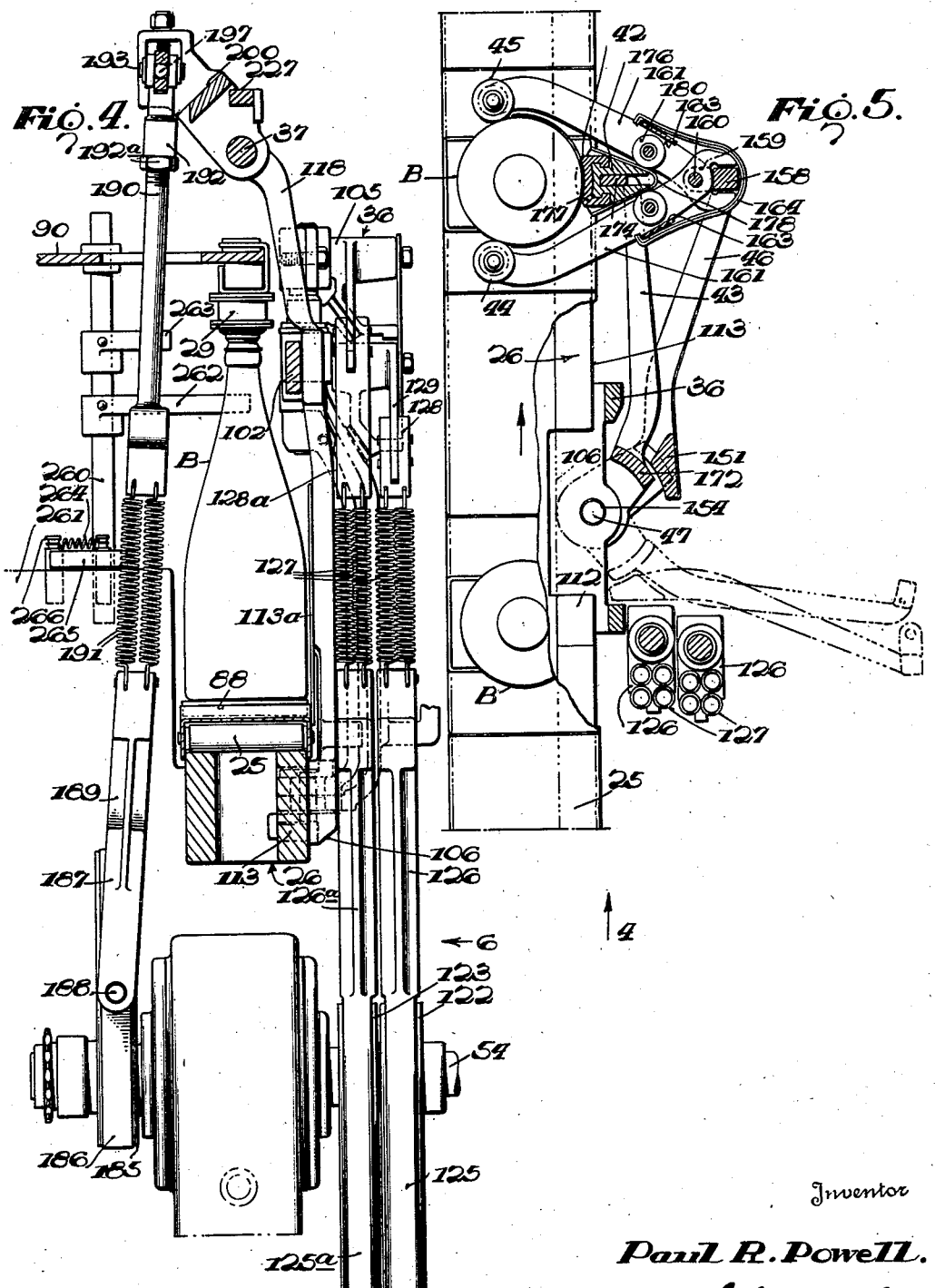

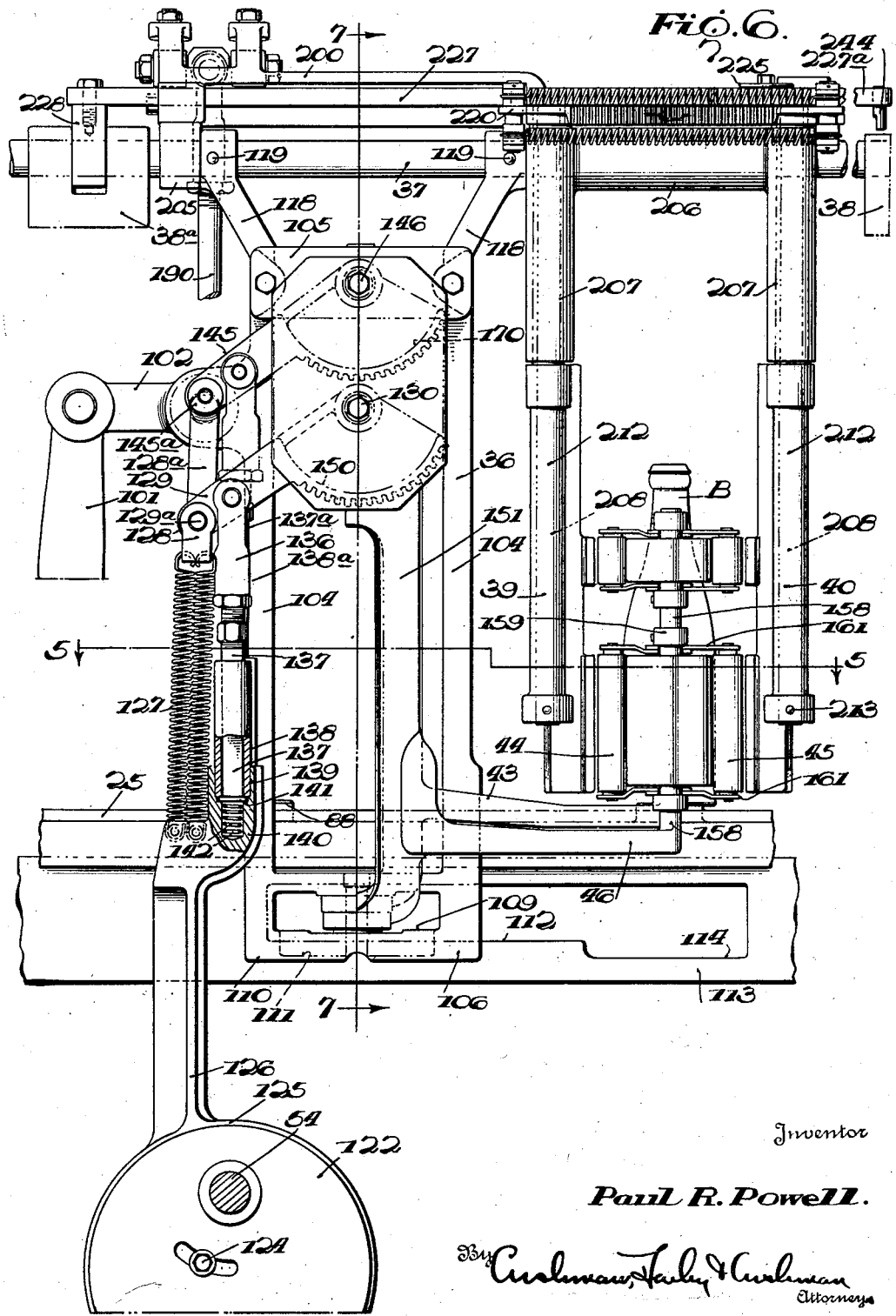

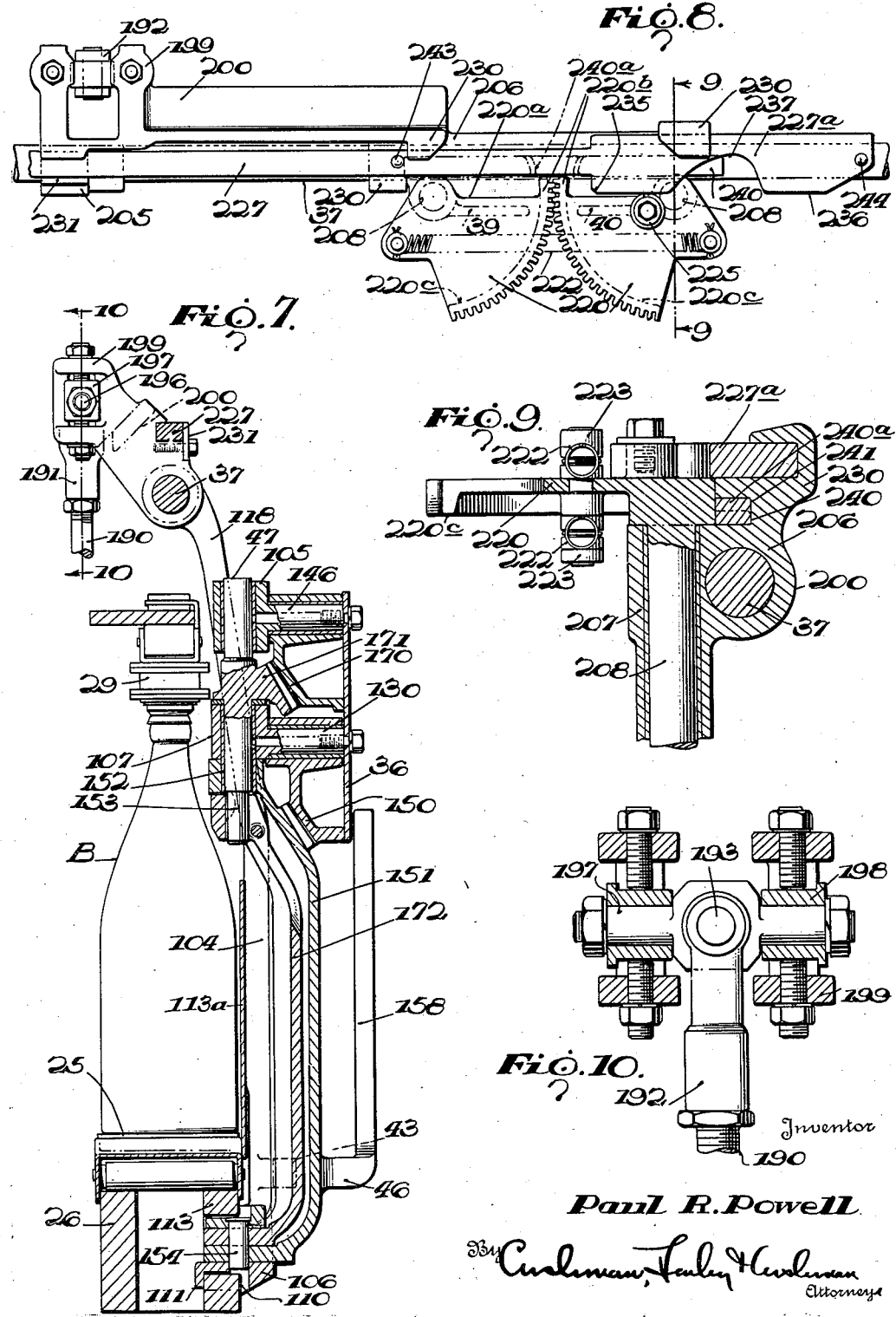

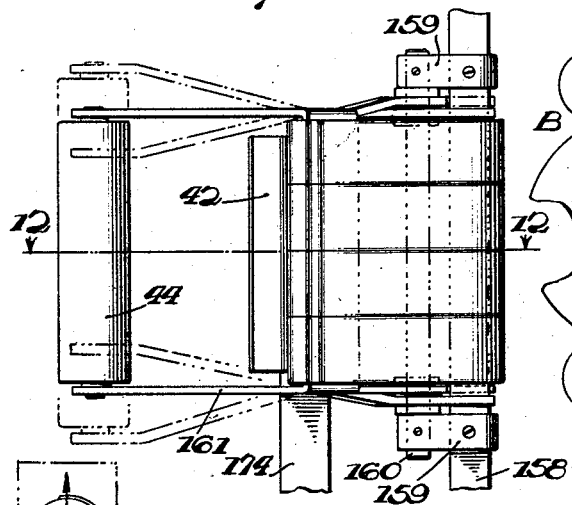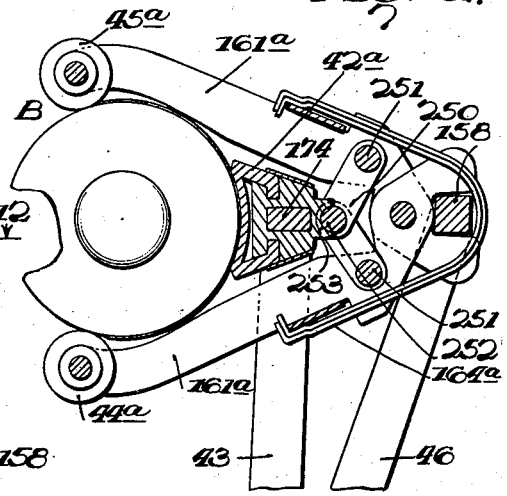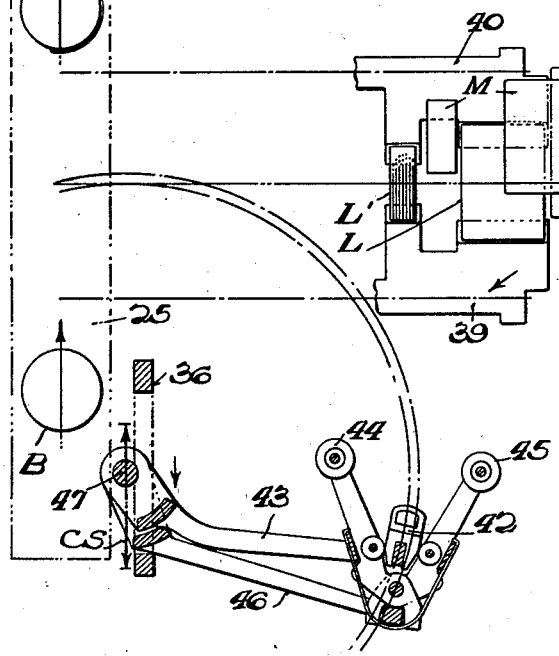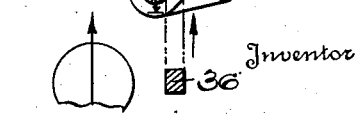

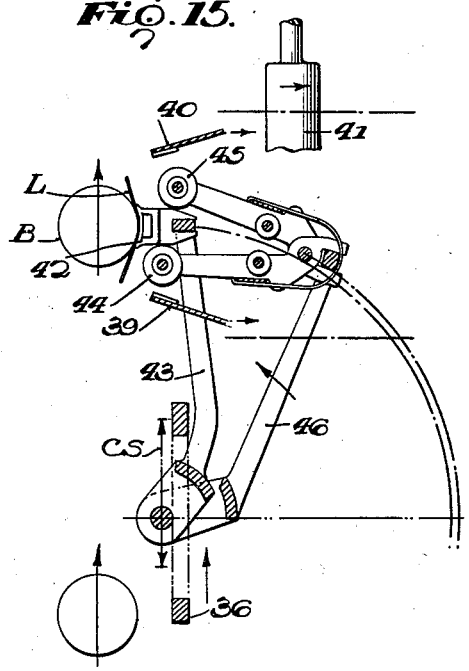
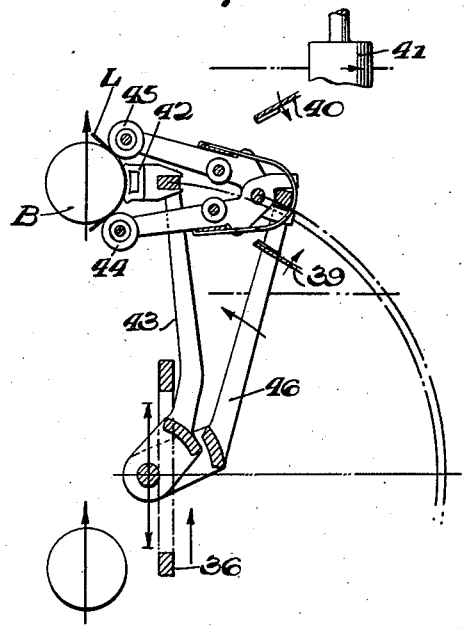
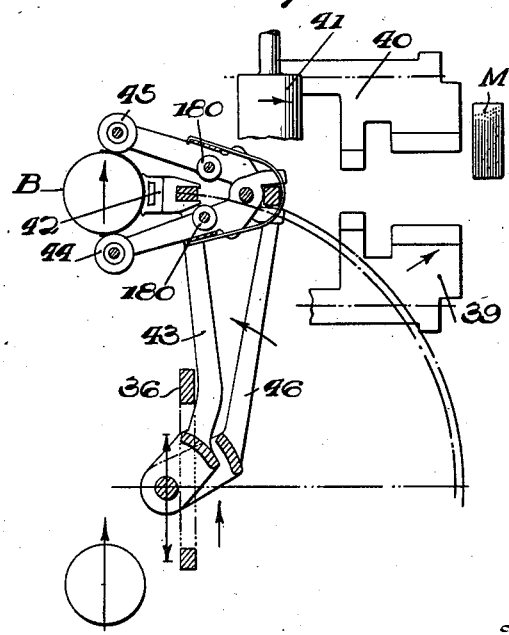
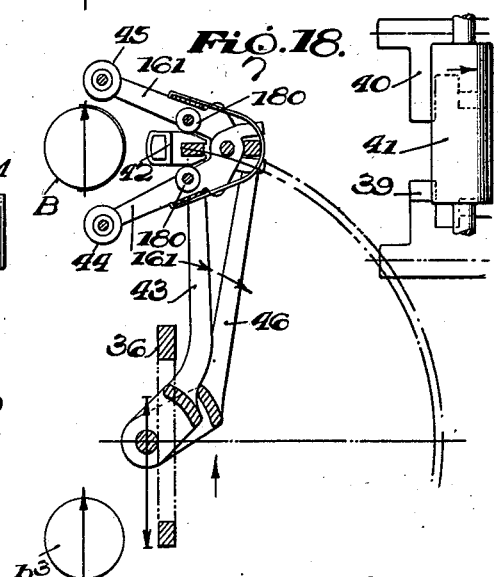

2,284,019

UNITED STATES PATENT OFFICE 2,284,019

LABELING APPARATUS

Paul R. Powell, Baltimore, Md.

Application March 16, 1940, Serial No. 324,424

36 Claims. (Cl. 216—54)

The present invention relates to a labeling apparatus.

Labeling mechanisms now in use for applying labels to bottles or other articles while the articles are in continuous movement are of such construction that the label is supported directly in the path of the article so that the article will strip the label from the pickers or other support.

A serious difficulty with such prior labeling mechanisms is that a label is very apt to be torn when the moving bottle or other article contacts with it while the label is still supported, at least at its edges, by the pickers. A further disadvantage resulting from the direct impact of the bottle with the rather loosely supported label is that the label may be twisted as it is forcibly stripped from the pickers and therefore will not be properly aligned upon the bottle.

The principal object of the present invention is to provide a labeling mechanism of such construction that the possibility of labels being torn or improperly positioned upon an article will be eliminated.

A further object of the invention is to provide a labeling mechanism which will be highly efficient for applying labels to continuously moving articles.

The labeling apparatus of the present invention is of such construction that labels will be applied laterally against a continuously moving article, with the result that the movement of the article is not relied upon to strip or otherwise remove the label from the pickers, but on the other hand, the pickers and the other elements cooperating therewith carry the label toward the article and positively apply it preferably while moving with the article. The fact that the article has no operating function whatever in the application of a label thereto entirely eliminates the possibility of tearing the label or of its being improperly applied.

Another object of the invention is to provide a labeling mechanism of such design that all of the label handling elements can be readily adjusted or replaced with corresponding elements adapted to handle labels of other sizes or shapes or to be used with articles of different sizes and shapes.

A further object of the invention is to provide novel forms of presser foot structures, wipers and pickers for use upon various labeling apparatus, as well as novel means for operating the same.

Other objects and advantages of the invention will be apparent from the following drawings, wherein:

Figure 1 is a rear elevation of the machine, portions of the supporting structure being broken away and the overhead clamping element being omitted;

Figure 2 is an elevation of the infeed end of the machine;

Figure 3 is a vertical transverse sectional view on the line 3—3 of Figure 1;

Figure 4 is an end view of the structure shown in Figure 5, the view being taken in the direction of the arrow "4" in Figure 5;

Figure 5 is a detailed horizontal sectional view on the line 5—5 of Figure 6;

Figure 6 is a rear elevation of the pickers, wipers and presser foot shown in Figure 4, the view being taken in the direction of the arrow "6" in Figure 4;

Figure 7 is a vertical sectional view on the line 7—7 of Figure 6;

Figure 8 is a top plan view of the picker actuating mechanism;

Figure 9 is a vertical sectional view on the line 9—9 of Figure 8;

Figure 10 is a vertical sectional view on the line 10—10 of Figure 7;

Figure 11 is a side elevation of the wiper and presser foot structure;

Figure 12 is a horizontal sectional view of a modified form of wiper and presser foot structure, the view being taken on a line corresponding to the line 12—12 of Figure 11;

Figures 13 to 19 are diagrammatic views in top plan showing the various positions of the pickers, wipers and presser foot during the application of a label to a bottle;

Figure 20 is a top plan view similar to Figure 8 of the picker actuating mechanism, the view showing the mechanism at the opposite end of its stroke from the position shown in Figure 8; and Figure 21 is a vertical sectional view on the line 21—21 of Figure 20.

The drawings illustrate the machine operating upon bottles, but it will be understood that such showing is merely for purpose of description and that numerous types of articles can be handled by the invention structure.

Throughout the following specification the rear of the machine is regarded as the side of the machine shown in elevation in Figure 1, and which side is at the right in Figures 2 and 3. It will thus be noted that bottles B move across the front of the machine, that is, across the portion shown at the left in Figures 2 and 3.

GENERAL CONSTRUCTION AND OPERATION

As stated in the objects set forth above, the present machine is designed to apply a label to a bottle or other article while the bottle is continuously moving, and, more particularly, to apply a label laterally to the bottle, as distinguished from machines in which labels are applied to the front of a moving bottle, that is, in direct opposition to the movement of the bottle. Therefore, by the present apparatus the label applying elements, i. e., the pickers, presser foot and wipers, move laterally inwardly against the bottle and also move forwardly with it along its path of travel. Also, generally speaking, after operating upon a bottle the label applying elements move laterally away from that bottle and also move rearwardly, longitudinally of the machine, in order to move laterally in against the succeeding bottle.

Referring to Figures 1, 2, and 3, the machine comprises a substantially rectangular and boxlike base frame 24 in which the driving mechanism is enclosed and supported. An endless and continuously moving bottle supporting conveyor 25 moves across the front of the table 26 which forms the upper wall of the base 24, the conveyor moving in the direction of the arrow in Figure 1. A super-structure 27 extends upward from the table 26, this super-structure comprising an upper and generally open rectangular and horizontal frame supported at its four corners by legs 28 which join the base frame 24.

An endless and moving bottle clamping element 29 is suitably supported adjacent the superstructure 27 and is adapted to bear downwardly upon the upper ends of the bottles during their movement through the machine to prevent the bottles from being overturned while being labeled.

As best shown in Figure 1, bottle supporting conveyor 25 moves in the direction of the arrow so that bottles B enter the machine at the left of this view. A label magazine 34 is supported upon the super-structure 27 near the outfeed end of the machine, with a glue pot 35 (Figure 3) just below it and to its rear.

In order that the label applying elements may move longitudinally of the machine with a bottle being labeled and then returned to meet the succeeding bottle, these elements are mounted, as best shown in Figure 6, upon a labeling carriage 36 longitudinally reciprocable of the table 26 and which carriage includes a horizontally and longitudinally reciprocable rod 37 mounted in forward extensions 38 (Figures 2 and 3) of the superstructure 27. The carriage 36 and rod 37 are reciprocated with the moving bottles B by means subsequently described.

Two pickers 39 and 40 of plate form are mounted for upward and downward swinging movement upon the rod 37 so that while moving longitudinally of the machine with rod 37 they will also swing from a substantially horizontal position against the lowermost labels in the label magazine 34 down to a substantially vertical position adjacent the bottle, and then return. During such movement, the relative position of the two pickers 39 and 40 with respect to each other will vary, that is, when they are adjacent the label magazine, they will both lie in the same plane as indicated in top plan in Figure 19. On the other hand, when the pickers are adjacent the bottle as shown in Figure 15, they will so turn with respect to each other as to be almost parallel.

During the upward movement of the pickers 39 and 40 toward the label magazine 34 a glue transfer roller 41 (Figure 3) will apply glue to a portion of the upper surfaces of the two pickers so that the lowermost labels in the label magazine will adhere to this surface.

As best shown in Figure 5, the presser foot 42 is carried by a horizontal arm 43 and the wipers 44 and 45 are carried by a horizontal arm 46. The arms 43 and 46 are concentrically pivoted upon the labeling carriage 36 about an axis 47, as best shown in Figures 5 and 7. The two arms 43 and 46 are so operated that the presser foot 42 and wipers 44 and 45 will move in against a bottle through the successive positions shown in Figures 14 and 15 and while the labeling carriage is moving with a bottle and will then swing away from the bottle to permit the carriage 36 to move back toward the infeed end of the machine in readiness to meet the succeeding bottle.

It may be stated that when the pickers 39 and 40 have swung downwardly to the substantially vertical position diagrammatically indicated in top plan in Figure 14 and have commenced the turning movement there indicated, the presser foot 42 will swing inwardly to bear upon the central portion of the label L so as to hold it against the bottle while the pickers continue to turn toward the position of Figure 15, thereby causing the ends of the label to be partly stripped from and partly slide off of the inner edges of the pickers.

After the pickers have turned to the position shown in Figure 15 so as to be almost parallel, the wipers 44 and 45 will move to the position of Figure 16, with one wiper on each side of the presser foot so as to wipe the edges of the label about the bottle as shown in the successive positions of Figures 16 and 17. Presser foot 42 will then begin its rearward horizontal swinging movement so as to force the wipers apart as shown in Figure 18 and the presser foot and wipers will then return through a horizontal arc of substantially 90° after which the labeling carriage 36 will begin its rearward movement longitudinally of the machine in readiness to position the labeling elements to act upon the succeeding bottle.

Driving mechanism and conveyor

The numeral 50 designates a motor suitably mounted within the base 24 and which, through sprocket chain 51 (Figures 1 and 2) drives a sprocket wheel 52 fixed to a shaft 53. Shaft 53 is suitably geared to a main cam shaft 54 provided with a number of main cams, hereinafter described. Shaft 54 is also geared to a shaft 55 which extends longitudinally of the machine and carries a cam 56. A shaft 57 journaled in the upper and rear portion of a base 24 is provided at one end with an arm 58 having a roller at its outer end as shown in Figure 2 to bear upon the cam 56. As illustrated in Figures 1 to 3, shaft 57 has a pair of spaced arms 63 extending vertically upwardly from the same past the glue pot 35. A link 64 extends forwardly from the upper end of each lever 63, the free ends of the links supporting the glue transfer roller 41 between them.

Roller 41 is provided at one end with a reduced hub portion adapted to roll upon a slightly curved and substantially horizontal track bar 66. It will be obvious that by the above arrangement the rotation of cam 56 will cause the vertical arms 63 to swing between the solid line and dotted line positions shown in Figure 3. When the arms 63 are in the dotted line position, the glue transfer roller 41 will contact with the fountain roller 68 in the glue pot 35, while forward movement of the arms 63 will cause the glue transfer roller 41 to move to the solid line position of Figure 3. Upon the reverse movement of the arms 63, the roller 41 will move across the upper surface of the picker plates 39 and 40 to apply glue thereto.

As best shown in Figure 3, shaft 55 has a sprocket wheel secured thereto by means of which it drives a sprocket chain 70 to rotate the fountain roller 68 of the glue pot in well known manner. The glue pot 35 may be of any desired construction such as ordinarily used and is preferably removable from the super-structure 28.

Referring to Figure 1, the main cam shaft 54 has a sprocket secured thereto so that it may drive, by means of a heavy sprocket chain 72, a large sprocket wheel 73 fixed to a horizontal shaft 74 at the outfeed end of the machine. Shaft 74 carries a sprocket drum 75 about which the bottle supporting conveyor 25 moves. The opposite end of sprocket chain 25 moves about a large sprocket drum 76 provided at the infeed end of the machine. The shafts carrying the drums 75 and 76 are preferably journaled in horizontal extensions of the base 24 of the machine. If desired, as generally indicated in Figure 1, the machine may be provided with a by-pass conveyor 80 positioned forwardly of the bottle supporting conveyor 25 and upon which bottles may be moved past the apparatus without having labels applied thereto. By-pass conveyor 80 may be driven from the conveyor drive shaft 74 through a sprocket chain 74a. A take-up device 83 is preferably associated with one run of the conveyor driving sprocket chain 72 in order to hold the same under proper tension.

In order to prevent bottles or slender articles from being tilted or knocked over during the application of labels thereto, the machine includes a bottle clamping element 29 associated therewith. This element preferably comprises an endless chain moving in a horizontal plane about sprocket wheels 85 (Figure 3) mounted upon spaced vertical shafts such as 81 extending upwardly from the table portion 26 and suitably driven in synchronism with the bottle supporting conveyor 25, as by the worm gearing 81a indicated in Figure 1. The element 29 preferably is provided with a plurality of socket elements 86, each of which is provided with a spring pressed plunger 87, the socket elements being spaced along the endless chain of element 29 so that each socket will be aligned with a resilient bottle supporting socket 88 on the bottle supporting conveyor 25. Each socket 86 of element 29 includes an upwardly extending portion 89 which engages a plate 90 of such shape as to substantially conform to the run of element 29 and mounted upon posts 91 extending upwardly from the table 26. A housing 94 (Figure 2) is provided at each end of the plate 90 and the housing is provided with cam means, not shown, which serve to lift a plunger 87 at the moment that such plunger moves adjacent a bottle carried upon the infeed portion of bottle supporting conveyor 25, the cam means being of such formation that it will permit the plunger 87 to come into contact with the bottle before the bottle is carried adjacent the labeling elements by the supporting conveyor 25. Since the plungers 87 are downwardly spring pressed, pressure will be exerted upon the bottle to maintain it upright upon the supporting conveyor 25 while the bottle is being labeled. A similar casing 94 is provided at the outfeed end of clamping element 29 to raise each plunger 87 from a bottle so that the bottle may move freely from the machine.

It will be understood that the bottle clamping element, generally described above, may be replaced by an endless belt moving in a vertical plane at a suitable height above the bottle supporting conveyor 25 and with its lower run downwardly spring pressed so that bottles will be securely clamped upon the bottle supporting conveyor 25 during their movement past the labeling elements.

Whatever type of clamping device is used, it is preferable that it be so mounted as to be vertically adjustable to permit runs of bottles of different heights to be handled upon the machine.

*Labeling carriage*

The main cam shaft 54 is provided with a plurality of cams by means of which the labeling carriage 36 is reciprocated longitudinally of the machine and the labeling elements are given their proper movement. A cam 100 fixed to shaft 54 is engaged by the lower arm of a large bell crank 101 mounted for swinging movement in an extension 102 of one journal of shaft 54. Bell crank 101 is held in engagement with cam 100 by a heavy spring 103 and its upper end (Figures 1 and 6) is connected by a horizontally extending link 102 to the labeling carriage 36 so that swinging movement of the bell crank 101 will cause the carriage 36 to be reciprocated longitudinally of the machine.

As best shown in Figure 6, the labeling carriage 36 is in the form of a vertically arranged rectangular frame including side bars 104, a top bar 105 and bottom bar 106. As best shown in Figure 7, a cross bar 107 extends between the side bars 104 at a point slightly below the top bar 105. The bottom bar 106 includes a horizontally extending cutout portion 109, hereinafter described and, as best shown in Figures 6 and 7, the lower surface of bottom bar 106 is longitudinally recessed to provide spaced longitudinal shoulders 110 and 111. These shoulders are adapted to engage about the lower edge of a slot 112 in a bar 113 extending longitudinally of the table 26 beneath the bottle supporting conveyor 25. In effect, the bottom bar 106 of carriage 36 is seated in the cutout 112 of bar 113 so that it may slide upon the same. It will be noted that the portion of cutout 112 nearest the outfeed end of the machine, that is, to the right in Figure 6, is downwardly enlarged as indicated at 114. By this arrangement the carriage 36 may be entirely released from the bar 113 when it is manually moved to the extreme right of the cutout 112.

As diagrammatically indicated in Figures 4 and 7 a guard plate 113a may be positioned between the conveyor 25 and the operating mechanism at the infeed portion of the machine.

The upper bar 105 of the carriage 36 is bolted to the side bars 104 adjacent the upper ends of the latter, as shown in Figure 6. The side bars 104 are inclined slightly forwardly as indicated at 118 above upper bar 105 as illustrated in Figure 7, these extensions being apertured so that the horizontal rod 37 may be secured therein by pins 119.

Rod 37 is supported at each end for reciprocation in the forward extensions 38 of the superstructure 28. As best shown in Figure 2, the extensions 38 are secured to the superstructure 28 by bolts. By disconnecting the extensions 38 from the superstructure, the rod 37 may be moved toward the outfeed end of the machine in order to align the lower bar 106 of carriage 36 with the enlarged cutout 114 of bar 113 so that the carriage 36 and rod 37 may be removed from the machine and replaced by corresponding elements fitted with label applying elements adapted to act upon articles of other sizes or conformations. Prior to the above mentioned removal of carriage 36 and rod 37, the bell crank 101 must be disconnected from the carriage 36 by freeing the link 102 from the carriage. The other operating means of the apparatus, hereinafter described, must also be disconnected from the carriage and rod and the manner in which this is done will be subsequently described.

It will be understood that the normal longitudinal reciprocation of carriage 36 during labeling operations is not sufficient to bring the lower end of the carriage into alignment with the enlarged cutout 114 in bar 113.

*Presser foot and wipers*

The presser foot 42 and wipers 44 and 45 are actuated from the main cam shaft 54 by a pair of eccentrics 122 and 123. These eccentrics may be adjustably secured to discs, not shown, fixed to the shaft 54 by means of a bolt and slot connection 124 as indicated in Figure 6 so that the eccentrics may be timed. The eccentrics 122 and 123 are surrounded by straps 125 and 125a, respectively, which have rods 126 and 126a, respectively, extending upwardly therefrom toward the labeling carriage 36. The upper portion of each rod has a plurality of coil springs 127, preferably four, removably secured thereto. The springs associated with the rearward rod 126 at their upper ends are detachably secured to a link 128 pivoted at 129a to the outer end of a segmental gear arm 129 rotatable upon a horizontally extending pin 130 (Figures 6 and 7) projecting rearwardly from the intermediate cross bar 107 of carriage 36.

A second connection between the rearward eccentric strap rod 126 and the upper gear arm 129 is provided by means of a link 136 pivoted to arm 129 inwardly of link 128. Link 136 has a stud 137 threaded thereto, which stud slides within a sleeve 138 extending upwardly from a socket 139 in an offset portion 140 of rearward eccentric strap rod 126. A disc 141 of greater diameter than the bore of sleeve 138 is positioned in socket 139 beneath the sleeve 138 and is held up against the lower end of the sleeve and the stud 137 by a coil spring 142 seated in a lower portion of socket 139. By the above arrangement, downward movement of eccentric strap rod 126 will cause a downward pull to be exerted upon arm 129 through the four coil springs 127, while upward movement of eccentric strap rod 126 will cause arm 129 to be swung upwardly through pressure exerted upon the lower end of stud 137.

The rod 126a of the eccentric strap 125a surrounding the inner eccentric 123 is connected in the same manner as has been described above to a segmental gear arm 145 pivoted upon a pin 146 extending rearwardly from the top bar 105 of labeling carriage 36. Since, as shown in Figure 6, the arm 145 is above the arm 129, the link 128a and stud 137a associated with arm 145 are somewhat longer than the corresponding elements which connect the lower segmental gear arm 129 and rearward eccentric strap rod 126.

The lower arm 129 has a beveled gear segment 150 secured thereto so that when the arm 129 is moved upwardly or downwardly by the eccentric strap arm 126, the segmental gear 150 will rotate about the pin 130. The teeth of gear 150 mesh with teeth upon the upper and segmental portion of a slightly bowed rod 151 which, as shown in Figure 7, is pivoted for turning movement about the vertical axis 47 upon a bushing 152 surrounding a pin 153 journaled in the two upper arms 105 and 107 of carriage 36. The lower end of rod 151 is pivotally supported upon a pin 154 mounted in the lower arm 106 of carriage 36 and the arm 46 which carries the wipers 44 and 45 extends from the rod 151.

The free end of arm 46 has the wipers 44 and 45 mounted thereon as best shown in Figures 5, 6 and 11, by the following arrangement: Arm 46 is provided at its free end with an upstanding post 158 having small forwardly and horizontally extending upper and lower brackets 159 fixed thereto. A pin 160 extends between the brackets 159 and has upper and lower pairs of levers 161 pivoted thereon, each pair in scissors relation as best shown in Figures 5 and 11. The longer portions of the levers extend forwardly and the wiper rollers 44 and 45 are mounted for rotation between the upper and lower levers of each pair. The shorter arms of the levers extend alongside the post 158 so as to limit the closing movement of the longer arms. Vertically arranged plates 163 connect the upper and lower levers at each side of a pair and the longer arms 161 of the levers are urged to closed position by a series of U-shaped springs 164 which are fitted about the post 158 and have their ends bearing upon the outer surfaces of the vertical plates 163.

As shown by dotted lines in Figure 11, wiping rolls of different lengths may be fitted between the levers 161.

As shown in Figure 6, the upper segmental gear arm 145 has a beveled segmental gear 170 secured thereto to swing with the arm upon the pin 146. Referring to Figure 7, the teeth of segmental gear 170 engage a gear segment 171 preferably formed integrally with the pin 153 which is journaled on the axis line 47 in the two upper arms 105 and 107 of carriage 36. At the extreme lower end of pin 153, the upper end of a vertically extending and slightly bowed rod 172 is secured to the same, the lower end of rod 172 being mounted for turning movement upon the pin 154 in the lower cross arm 106 of carriage 36. It will be observed that rod 172 is positioned within rod 151.

The arm 43 which carries the presser foot 42 extends horizontally from bar 172. The outer end of arm 43 is provided with an upstanding portion 174 which carries the presser foot. As illustrated in Figures 5 and 11, the presser foot 42 comprises a body member 176 of substantially triangular form in horizontal section and having its apex positioned rearwardly and slotted to embrace the upstanding post 174. The slide wall of the body member 176 is grooved to receive the inturned edges of a substantially U-shaped rubber strip 177 which forms the contact member of the presser foot. The edges of the contact member 177 are held in the groove of the body member 176 by a series of vertically spaced angled springs 178. The springs are held in place along the body member 176 by screws, not shown.

As diagrammatically shown in Figure 5, the front portion of rubber strip 177 is normally out of contact with the presser foot body member 176 and thus forms a cushion element which will accommodate itself to the surface being labeled, as shown in Figure 5.

It will be noted that since the body member 176 of the presser foot 42 has its apex facing rollers 180 mounted upon pins extending between the upper and lower arms of the scissors elements 161 of the wiper element, the body member 176 will, when in contact with the rollers 180, serve to spread the elements 161 carrying the wipers.

It will be observed that the eccentric strap rods 126 and 126a which operate the presser foot and wiper elements can be disconnected from the latter by unhooking the springs 127 which connect the rods to the respective segmental gear arms 129 and 145. When this has been done, the studs 137 and 137a which fit into the sleeves 138 and 138a of the eccentric strap arms can be removed from the sleeves. This arrangement frees the carriage 36 from the operating elements just referred to.

It will also be noted that the eccentrics 122 and 123 are so positioned upon the main cam shaft 54 that downward movement of the respective eccentric straps 125 and 125a and their associated rods will move the presser foot 42 and wiper rollers 44 and 45 against the articles to be labeled. The force exerted by the eccentric strap arms at this time is transmitted to the segmental gear arms 129 and 145 through the springs 127 and the contact of the presser foot and wipers with an article being labeled will be cushioned. Upward movement of the eccentric strap rods 126 and 126a will be exerted entirely through the disks 141 and 141a and studs 137 and 137a.

Pickers

The picker plates 39 and 40 are operated from an eccentric 185 mounted on the shaft 54 and surrounded by a strap 186 which has a yoke 187 pivotally connected thereto upon pins 188. A rod 189 extends upwardly from the yoke 187 and is connected to a connecting rod 190 by springs 191, similar to the springs 127, and a stud and sleeve connection, not shown, similar to that illustrated in Figures 4 and 6 for connecting the wiper and the presser foot operating eccentrics to the segmental gear arms 129 and 145. It will be noted from Figure 4 that the picker operating eccentric 185 is at the forward side of the bottle supporting conveyor 25.

The connection between the eccentric strap rod 189 and the upper connecting rod 190, just mentioned, can be released in the manner described above in connection with the presser foot and wiper operating mechanisms so that the carriage 36 and its associated reciprocable parts will be entirely free for removal from the machine in the manner described above. The springs 191 and the associated resiliently mounted stud and sleeve also provide a resilient connection between the pickers and the operating eccentric 185.

As shown in Figures 4, 7, and 10, the upper connecting rod 190 is threaded into a yoke 192 pivotally connected at 193 upon a trunnion 197 which is mounted in a horizontal plane and has its ends journalled as indicated in Figure 10 in journal elements 198 adjustably mounted in a box structure 199. The box structure 199 is part of a picker carrier 200 which is mounted upon the reciprocating rod 37 and, as hereinafter explained, turns upon and reciprocates with the latter rod. It will be observed that the manner of connecting the connecting rod 190 to the picker carrier 200 described above, as well as the manner of connecting the rod 190 to strap 186, insures that a full operative connection between the cam and picker carrier will be provided regardless of the angles between the operating elements which connect the same.

Picker carrier 200 is connected to reciprocating rod 37 by an apertured lug 205 (Figure 6) positioned upon rod 37 immediately adjacent the upward extension 118 of carriage 36 nearest the infeed end of the machine. From that point picker carrier 200 extends alongside the rod 37 to a point opposite the far end of carriage 36 and is there provided with a sleeve portion 206 which surrounds the rod 37 in abutment with the other extension 118 of carriage 36. The sleeve portion 206 extends slightly rearwardly from rod 37 as best shown in Figures 6 and 9, and has tubular portions 207 depending therefrom in which shafts 208 carrying the picker plates are mounted.

As best shown in Figure 6, the pickers 39 and 40 each include a hub or sleeve portion 212 having a bore therein which fits upon the corresponding shaft 208. At the lower end of each sleeve portion 212, a pin 213 extends through the lower end of the corresponding shaft 208 so that the pickers 39 and 40 will thereby rotate with the shafts. The plate portion of each picker is, as best shown in Figure 8, somewhat offset with respect to the axis of the supporting shaft 208. The picker plates may be of any desired outline in order to handle the labels to be applied. The pickers illustrated herein are of the type adapted to apply a small label L' to the top portion of a bottle and a larger label L to the body of the bottle.

As best shown in Figures 8 and 9, a gear segment 220 is fixed to the upper end of each picker shaft 208 so that the two segments mesh. The segments are cut away on their forward faces as indicated at 220a in Figure 8 and have extensions 220b at the outer edges of these faces for a purpose hereinafter described. Also, as best shown in Figure 9, each segment is thickened at its arcuate and toothed edge to form a depending flange 220c.

The two segments are urged to rotate forwardly by coil springs 222 secured to lugs 223 on the upper and lower faces of the respective segments, the lugs being positioned to the rear and laterally outwardly of the axis of the picker shafts 208. This action of the springs 222 serves to hold a cam engaging roller 225 on the upper surface of the picker segment 220 shown at the right in Figure 8 in engagement with a cam 227a carried by a cam bar 227 which extends along the normally upper side of rod 37 but is spaced therefrom, as shown in Figure 6.

Referring to Figures 6 and 8, the cam bar 227 has the cam 227a formed upon its end nearest the outfeed end of the machine and extends from a bracket 228 mounted in the bight of the bifurcated super-structure extension 38 which is nearest the infeed end of the machine. Since bracket 228 is enclosed by the extension 38a, it will not reciprocate with the rod 37. However, because of the bar 227 and cam 227a are engaged on their forward side as shown in Figure 8, by several overhanging ears 230 on the carrier 200 and by similar ears 231 on their rearward sides, the cam bar and cam will oscillate about and above the rod 37 with the picker carrier 200 as subsequently described.

Since the picker carrier 200 in effect surrounds the upper end of carriage 36 on rod 37, it will reciprocate longitudinally of the machine with rod 37 and carriage 36 when the latter are reciprocated by the action of the large bell crank 101. During such movement, the picker carrier 200, including its sleeve portion 206, will oscillate in a vertical plane about the rod 37 due to the action of the cam 185 transmitted through strap rod 189 and connecting rod 190.

During the longitudinal reciprocation of the picker carrier 200 with the rod 37, the cam engaging roller 225 of the right hand picker segment 220 will move along the rearward surface of the cam portion 227a of cam bar 227 which will oscillate about rod 37 with carrier 200 but will not reciprocate with the rod. As shown in Figure 8, the two end portions 235 and 236 of cam 227a are flat so that while the roller 225 is bearing on these portions, the picker plates 39 and 40 will lie in the same plane as indicated in dotted lines in Figure 8. However, a dwell or recess 237 is formed on the cam 227a between the two flat surfaces so that as the picker carrier 200 carries the roller 225 to the right along cam 227a in Figure 8, the roller 225 will move forwardly into this dwell with the result that the picker plates will swing forwardly to be almost parallel with each other as diagrammatically illustrated in Figure 15. As will be hereinafter explained, and as indicated in Figure 15, the cam 185 will then be swinging the picker carrier 200 and the pickers through that portion of their vertically reciprocable or oscillatable path of travel wherein they will have just carried a label to the bottle and have turned apart from each other to lie alongside the bottle.

Further movement of the picker carrier 200 to the right in Figure 8 with the rod 37 will cause the cam engaging roller 225 to reach the right hand (Figure 8) flat surface 236 of cam 227a, as shown in Figure 20, with the result that the pickers will again lie in the same plane as shown in dotted lines in Figure 20. At this latter moment, the pickers will be moving upwardly through a vertical plane to have glue applied thereto by the glue transfer roller 41. After this has been done and the pickers have removed labels from the label magazine 34, the picker carrier 200 will move to the left (Figure 8) with rod 37 and carriage 36 along the cam bar 227. Obviously, if the cam roller 225 were free to move into the dwell 237 of cam 227a on the return movement described above, the picker plates 39 and 40 would swing relatively to each other immediately after they have received a label and long before they come adjacent the bottle. In order to prevent such swinging action of the picker plates at this time, a lock slide 240 is mounted in recesses 241 in the lower portion of the ears 230 of picker carrier 200, as best shown in Figures 8 and 9. The lock slide is thus supported in the plane in which the depending flanges 220c of the gear segments 220 move. Lock slide 240 has a friction fit in the recesses 241 and hence tends to move with carrier 200. The lock slide also is provided with a cutout 240a substantially midway of its length which is of sufficient size to receive the flanges 220c of the segments 220 when the latter swing forwardly with the picker plates 39 and 40 as is intended to occur when the pickers have carried a label adjacent a bottle, as shown in Figure 15.

The longitudinal movement of lock slide 240 to the left (Figure 8) with picker carrier 200 is limited by a pin 243 extending downwardly from cam bar 227 intermediate its length. The right hand movement of the lock slide 240 to the right in Figure 8 is limited by a second pin 244 extending downwardly from the extreme right hand end of cam 227a.

The pins 243 and 244 are so spaced and the length of lock slide 240 is such that when the picker carrier 200 is at its left hand limit of longitudinal movement and the left hand end of lock slide 240 is in engagement with pin 243, the cutout 240a of the lock slide will be directly opposite the depending flanges 220c of the forward extensions 220b of the segments 220. As the picker carrier 200 moves to the right with the rod 37 and carriage 36, the frictional engagement of lock slide 240 in the carrier 200 will cause the lock slide to move to the right with the latter. Hence, the flanges 220c of the forward extensions 220b of the picker segments 220 may move inwardly to carry the pickers 39 and 40 to the position shown in Figure 15 or, in other words, the cam engaging roll 225 will be free to move inwardly into the dwell 237 of the cam 227a. However, just before the picker carrier 200 reaches its right hand limit of the lock slide 240 will contact with the pin 244 carried by the cam 227a, with the result that further movement of slide 240 will be prevented and carrier 200 will move on along it with rod 37 to carry the picker segment extensions 220b to a position slightly past the recess 240a of lock slide 240, as shown in Figure 20.

When the picker carrier 200 and picker segments 220 return to the left along cam 227a with rod 37, lock slide 240 will, because of its friction fit, also move to the left in the position relative to the carrier and picker segments 220 illustrated in Figure 20. As a result, when the cam engaging roller 225 comes opposite the dwell 237 and tends to swing forwardly, the flanges 220c of the extensions 220b of the picker segments 220 will immediately contact with the body portion of lock slide 240. Therefore, the picker plates 39 and 40 will remain in the same plane during such return movement. As has been stated above, and as will be hereinafter more fully explained, at this time the picker plates 39 and 40 have just removed a label from the label magazine 34 and are initiating their downward movement toward a bottle. Just before the picker carrier 200 reaches its left hand limit of movement along cam 227a with rod 37 and carriage 36, the left hand end of the lock slide 240 will contact with the left hand pin 243 carried by the cam bar 227 so that further left hand movement of the lock slide 240 will be prevented while the picker carrier 200 will move slightly further to the left to bring the flanges 220c of the extensions 220b of picker segments 220 directly opposite the recess 240a so that when the picker carrier again travels to the left along cam 227a, the depending flanges 220c of the extensions 220b will be free to enter the cutout 240a and permit the picker plates 39 and 40 to turn to a position substantially parallel with each other, as best shown in Figure 15.

*The label magazine*

The label magazine 34 may be of well known form including label stack holders 245 carried in a frame 246 removably supported on the open and upper portion of the super-structure 27.

The stack holders 245 are adjustable as to size and are also adjustable in both directions horizontally of the frame in order to permit their position to be varied so that labels may be applied to various areas of the pickers. The frame 246 also supports a horizontal arm 247 which overhangs the stack holders and has rods 248 depending therefrom to guide followers downwardly with the label stacks.

Figure 12 presser foot and wipers

Figure 12 shows a modified form of presser foot and wiper structure. The primary difference between the structure illustrated in Figure 12 and that shown in Figure 5 and hereinbefore described is that the arms 161a of the Figure 12 wiper structure carry a toggle device generally indicated by the numeral 250 and comprising a pair of levers pivoted on rods 251 carried by the arms 161a and pivotally joined at their adjacent ends about a vertical rod 252 which extends down between the wiper arms 161a just forwardly of their pivots. The rear surface of the presser foot 42a is provided with a socket 253 which, when the presser foot moves backwardly against the rod 252, will cause the latter to move rearwardly to spread the wiper supporting arms 161a. As is the case in the Fig. 5 structure, the wiper arms 161a will normally be urged toward each other by the bowed springs 164a.

Detailed operation of labeling elements

The operation of the labeling elements of the present apparatus is as follows:

Bottles or other articles delivered to the machine by a suitable conveyor will be received on conveyor 25 and moved through the machine from left to right as indicated by the arrow in Figure 1. Suitable mechanism, similar to that shown in Patent No. 2,013,144 for Bottle handling machine and control therefor, issued to Wiltie I. Gladfelter on September 3, 1935, may be provided on the machine to insure that incoming bottles will be positioned upon the bottle supporting seats 88 provided on conveyor 25. If bottles are being handled, immediately after they have been thus positioned, their upper ends will be engaged by the clamping element 29 so that they will be held against tilting during movement through the machine.

Referring to Figures 13 to 19, wherein the operation of the label applying elements and the movement of the longitudinally reciprocable carriage 36 and its associated reciprocable elements are diagrammatically illustrated, Figure 19 shows the various parts at the beginning of what may be regarded, for present purposes, as the beginning of a cycle of operation.

In Figure 19, an incoming and unlabeled bottle b is indicated at position b' while a bottle B which has just had labels applied thereto, is indicated at position b2. The reciprocable stroke of the carriage 36 is indicated by the line CS. It will be observed from this that the labeling carriage 36 is at its limit of movement toward the outfeed end of the machine and that the presser foot 42 is swinging away from the bottle supporting conveyor 25 with the wipers 44 and 45, the presser foot 42 being in engagement with the wiper spreading rolls 180 so that the wiping rolls 44 and 45 are spread apart. At this time, the picker plates 39 and 40 are in engagement with the lowermost labels L and L' of the label magazine 34 and the glue transfer roller 41 is in contact with the fountain roll 68 of the glue pot.

Referring to Figure 13, showing a second stage in the cycle, the carriage 36 and its associated reciprocable elements has now begun to move toward the infeed end of the machine, while the bottle B has moved somewhat further toward the outfeed end. The presser foot 42 and wiper rolls 44 and 45 have reached their rearward limit of swinging movement upon the carriage 36 and the pickers have swung somewhat downwardly toward the conveyor 25 and (due to the movement of carriage 36 and its associated reciprocable elements, including the rod 37 and picker carrier 200) toward the infeed end of the machine, the picker plates 39 and 40 are simultaneously moving toward the infeed end of the machine as they swing downwardly, as indicated by the arrow appearing upon the picker plate 39. The extent of the forward movement and movement toward the infeed end of the machine of the picker plates 39 and 40, carrying labels L and L' is indicated by the labels M shown in Figure 13 and which represent the now lowermost labels in the label magazine 34. The glue transfer roller 41 has begun to swing toward the front of the machine.

Referring to Figure 14, this view shows the label applying elements substantially advanced from the position shown in Figure 13 in that the carriage 36 and its associated reciprocable elements have now entirely reached the end of their movement toward the infeed end of the machine and have commenced reciprocable movement toward the outfeed end of the machine, that is, movement in the direction of travel of the bottle B. Also, the picker plates 39 and 40 have now swung downwardly to a substantially vertical position and the movement of the cam roller 225 (Figure 8) into the dwell 237 of cam 227a has caused the picker plates to begin forward turning movement as indicated by the arrows applied thereto. It will be observed that the turning movement of the picker plates moves the central portion of the label L against the bottle, the ends of the labels still adhering in Figure 14 to the inner edge portions of the picker plates. Also, the presser foot 42 is just about to contact with the central portion of the label to hold it in engagement with the bottle while the wiper rolls 44 and 45, positioned in close proximity to each other by the action of the springs 164, are moving forwardly behind the picker. It may be stated that the presser foot supporting arm 43 begins inward movement toward a bottle somewhat in advance of the wiper supporting arm 46, with the result that the presser foot will contact with the bottle in advance of the wipers. In Figure 14, the glue transfer roller 41 is at its forward limit of movement. Carriage 36 is now moving toward the outfeed end of the machine at the same speed as the bottle.

Referring further to Figure 14, it will be noted that the turning movement of the picker plates 39 and 40, shown in progress in this figure and which continues until the pickers are in the relative position with respect to each other shown in Figure 15 (that is, almost parallel to each other), will cause the edge portions of a label to slide somewhat along the rear surface of the pickers as the pickers turn, since the central portion of the label is firmly held against the bottle. Combined with this sliding movement there is also a slight stripping action, but the components of the two movements are such that at least the label is not entirely stripped or ripped from the picker plates. The fact that the label has a sliding movement along the picker plates further obviates the possibility of the label being torn as it leaves the picker plates.

In Figure 15, the picker plates 39 and 40 have now begun to swing backwardly toward the label magazine 34 by reason of the upward rotation of the picker carrier 200 induced by the downward movement of connecting link 190 and cam strap rod 189 (Figure 4) caused by the corresponding cam 185. However, carriage 36, rod 37, and picker carrier 200 have not yet moved sufficiently far toward the outfeed end of the machine to bring the cam engaging roller 225 out of the dwell 237 of cam 227a and the picker plates 39 and 40 are therefore still turned forward to opened position in order to provide ample room for the wipers 44 and 45 to move inwardly between the same. Figure 15 also shows the presser foot 42 bearing firmly upon the central portion of the label. The glue transfer roller 41 has started its rearward movement toward the glue pot.

In the position of Figure 16, the picker plates 39 and 40 have partially turned with respect to each other after having swung upwardly sufficiently far to clear the wiper structure. This turning movement of the pickers is occasioned by the fact that the cam engaging roller 225 on picker segment 220 has reached the left hand slope (Figure 8) of the dwell 237 of cam 227a. The presser foot 43 is still in contact with the central portion of the label L upon the bottle B and the wipers 44 and 45 are now in contact with the label at the portions thereof adjacent the presser foot.

In Figure 17, which shows a position of the parts closely adjacent that of Figure 16, the wipers 44 and 45 have almost completed their movement along the edges of the label to attach the same to the bottle, carriage 36 and its associated reciprocable elements are still moving in the same direction as the bottle and the pickers 39 and 40 are both lying in the same plane and have moved to a point just below the path of travel of the glue transfer roller 41 which is still moving rearwardly. The label M shown in Figure 17 indicates the position of the label magazine longitudinally of the machine and it will be noted from this as well as from the arrow applied to the picker plate 39 that the pickers, with the carriage 36, are still moving toward the outfeed end of the machine simultaneously with the upward swinging movement.

In Figure 18, the labeling carriage 36 and its associated reciprocable elements are still moving in the same direction as the bottle, though at a slower speed, but the wipers 44 and 45 have completed their forward swinging movement and the presser foot 42 has moved backwardly into contact with the wiper spreading rolls 180 so as to spread apart the wiper arms 161. Furthermore, both the presser foot arm 43 and the wiper arm 46 have commenced their rearward swinging movement with the wipers spread apart by the presser foot so that the wipers 44 and 45 are not in contact with the label at any time during their rearward swinging movement. It is to be emphasized that the wipers will be spread by the presser foot immediately they reach their limit of forward movement so that the wipers will subsequently be out of contact with both the label and the bottle. Also, the fact that the wipers are spread and that the carriage 36 is still moving in the same direction as the bottle will entirely prevent the bottle from contacting with the wiper 45 as the latter moves rearwardly.

In Figure 18, the pickers 39 and 40 are in contact with the glue transfer roller 41 so that glue is being applied to their upper surfaces by the roller as it swings rearwardly. It will be noted that in this figure, the glue transfer roller 41 extends over the picker plate 40 to a greater extent than the plate 39 because the carriage 39 and pickers are still moving in the same direction as the bottle. However, the roller 41 will only contact with the usual raised glue receiving areas of the picker plates.

In Figure 19, the carriage 36 and its associated reciprocating parts have reached the limit of their movement toward the outfeed end of the machine with the result that the pickers 39 and 40 will be properly aligned with the label magazine 34 and the wipers 44 and 45 have moved entirely away from the bottle which has been labeled and which is indicated at position b2. Also, the presser foot 42 and the wipers are moving beneath the pickers, which latter are in their uppermost and horizontal position. The glue transfer roller 41 has moved entirely out of the path of the pickers and is in contact with the fountain roll 68.

Throw-out mechanism

In the event that no bottle is positioned upon an article socket 88 of conveyor 25, it is desirable to prevent the picker plates 39 and 40 from receiving a label from the magazine 34. In order to obtain this result, a vertical shaft 260 (Figure 4) is journaled between a raised portion 261 of table 26 at the forward side of the conveyor 25, the upper end of the shaft 260 being journaled in the plate 90 which supports the clamping element 29. Shaft 260 carries a detector arm 262 and a stop arm 263, with the latter uppermost and the shaft is urged to turn to hold the stop arm 263 against connecting rod 190 by a spring 264 which is connected at one end to a lever 265 carried by the lower end of the shaft, the opposite end of the spring being connected to a stud 266 fixed to a table portion 261. The urging of the stop arm to that position will also hold detector arm directly in the path of bottles or other articles moving with conveyor 25.

In operation, if a bottle is positioned upon a socket 88 on conveyor 25 as that socket reaches the position indicated at b3 in Figure 18 (substantially opposite which position the shaft 260 is located on the table portion 261), such bottle will contact with the detector arm 262 to move that arm so as to turn shaft 260 against the action of spring 264 until the bottle has moved along sufficiently far with the conveyor 25 to clear the end of the detector arm. The rotation of shaft 260 will, of course, carry the stop arm 263 in the same direction as detector arm 262 and out of contact with connecting link 190 and the operation of the machine will in no way be affected.

However, if no bottle is present upon a socket 88 as the latter approaches position b3 of Figure 18 the detector arm 262 will not be swung forwardly with the conveyor in the manner described above and the stop arm 263 will remain in contact with the connecting link 190 which is exerting downward pull upon picker carrier 200 to swing the picker plates 39 and 40 upward from the position shown in Figure 18 to that shown in Figure 19, in which latter position they will receive a label from the magazine 34.

At this point in the cycle of operation the connecting rod 190 will be in a much lower position than that indicated in Figure 4 so that the locking nut 192a will be down almost in contact with the upper surface of stop arm 263, and continued downward movement of connecting link 190 will be prevented when the lock nut 192a, serving as a block, comes into contact with the upper surface of stop rod 263. As a result, further downward movement of the connecting link 190 will be prevented and the picker plates 39 and 40 will not be raised sufficiently far to reach the lowermost label of the label magazine. Hence, when the socket 88 in question comes adjacent the label applying elements, including the subsequently descending picker plates 39 and 40, the picker plates will move toward that socket with no label upon them. The fact that downward pull upon connecting link 190 is exerted primarily through the coil springs 191 will, of course, permit the cam strap rod 189 to move downwardly through the slight remaining distance of its stroke despite the fact that link 190 is held against such movement by the stop rod 263.

Subject matter disclosed but not claimed herein is claimed in my application for Conveyer structures, Serial No. 410,641 filed September 12, 1941.

The terminology used in the specification is for the purpose of description, the scope of the invention being indicated by the following claims.

I claim:

1. In a labeling apparatus, means to support and move articles along a predetermined path, a carriage movable along said path, label applying elements carried by said carriage and movable laterally toward said path, and means to move said carriage and label applying elements substantially at the same linear speed as said supporting means at least while the label applying elements are adjacent the article.

2. In a labeling apparatus, means to support and move articles along a predetermined path, a carriage movable along said path, label applying elements carried by said carriage and oscillatable with respect to said carriage and path, and means to move said supporting means, carriage and label applying elements in synchronism.

3. In a labeling apparatus, continuously moving means to support and move articles along a predetermined path, a carriage reciprocable along said path, label applying elements carried by said carriage and movable laterally with respect to said carriage toward said path, and means to move said supporting means, carriage and label applying elements in synchronism.

4. In a labeling apparatus, continuously moving means to support and move articles along a predetermined path, a carriage reciprocable along said path, label applying elements carried by said carriage and oscillatable with respect to said carriage and said path, and means to move said supporting means, carriage and label applying elements in synchronism.

5. In a labeling apparatus, means to move articles in a predetermined path, a frame structure fixed adjacent said path, a label magazine carried by said frame structure and spaced from said path, a picker support reciprocable along said path and also in a plane transverse thereto between said path and magazine, a picker plate movable in opposite directions carried by said picker support, and means to reciprocate said picker support along said path and in a direction transverse thereto, and move said plate with respect to said picker support.

6. In a labeling apparatus, means to move articles in a predetermined path, a frame structure fixed adjacent said path, a label magazine carried by said frame structure and spaced from said path, a picker support reciprocable along said path and also in a plane transverse thereto between said path and magazine, a picker plate movable in opposite directions carried by said picker support, means to reciprocate said picker support along said path and in a direction transverse thereto, and move said plate with respect to said picker support, and means to hold said plate against movement with respect to said picker support during one direction of transverse movement of said picker support.

7. In a labeling apparatus, means to move articles along a predetermined path, a frame structure fixed adjacent said path, an element reciprocable in said frame structure, a label magazine carried by said frame structure and spaced from said path, a picker support reciprocable with said element, a picker plate pivoted upon said picker support, and means to reciprocate said element along said path, reciprocate said picker support upon said element and between said magazine and path, and move said plate with respect to said picker support.

8. In a labeling apparatus, means to move articles along a predetermined path, a frame structure fixed adjacent said path, an element reciprocable in said frame structure, a label magazine carried by said frame structure and spaced from said path, a picker support reciprocable with said element, a picker plate pivoted upon said picker support, means to reciprocate said element along said path, reciprocate said picker support upon said element and between said magazine and path, and move said plate with respect to said picker support, and means to hold said plate against movement with respect to said picker support during one direction of movement of said picker support.

9. In a labeling apparatus, means to support and move articles in a predetermined path, an element reciprocable along said path, and a presser foot and wiper device reciprocable on said element in a plane parallel to the plane of said path.

10. In a labeling apparatus, a base, means to support and move articles along a predetermined path on said base, a removable carriage reciprocable on said base along said path, label applying elements on said carriage, driving means on said base, and disconnectable means operatively connecting said carriage means and said label applying means to said driving means.

11. In a labeling apparatus, a base, means to support and move articles along a predetermined path on said base, a carriage reciprocable on said base along said path, label applying elements on said carriage, driving means on said base, and means resiliently and operatively connecting said carriage means and said label applying means to said driving means.

12. In a labeling apparatus, a support, a presser foot oscillatable on said support, a pair of wiper arms oscillatable on said support, said wiper supporting arms being pivotally connected and adapted to extend respectively on opposite sides of said presser foot, and a toggle connection between said presser foot and wiper arms whereby movement of said presser foot with respect to said wiper arms will vary the spacing of said arms with respect to each other.

13. In a labeling apparatus, means to support and move an article along a predetermined path, a picker support movable through a path transverse to said first path, a picker pivoted upon said picker support, a label magazine spaced from said first path, and means to move said picker support in said second path to move said picker between said magazine and said first path and turn said picker with respect to said picker support during such movement.

14. In a labeling apparatus, means to support and move an article along a predetermined path, a picker support mounted for swinging movement through a path transverse to said first path, a picker pivoted upon said picker support, a label magazine spaced from said first path, and means to move said picker support in said transverse path to move said picker between said magazine and said first path and turn said picker with respect to said picker support during such movement.

15. In a labeling apparatus, means to support and move an article along a predetermined path, a picker support movable through a path transverse to said first path, a picker pivoted upon said picker support, a presser foot, a wiper device, said presser foot and wiper device being mounted for movement toward said first path, a label magazine spaced from said first path, and means to move said picker support in said transverse path to move said picker from said magazine to conduct a label to an article, then turn said picker with respect to said picker support and move said presser foot and wiper device into contact with the label.

16. In a labeling apparatus, means to support and move an article along a predetermined path, a picker support oscillatable through a path transverse to said first path, a picker pivoted upon said picker support, a presser foot, a wiper device, said presser foot and wiper device being mounted for movement toward said first path in a plane transverse to that in which the articles stand, a label magazine spaced from said first path, and means to move said picker from said magazine to conduct a label to an article, then turn said picker with respect to said picker support and move said presser foot and wiper device into contact with the label.

17. In a labeling apparatus, means to support an article, a picker plate movable to the article, a presser foot movable to the article, means to hold said picker plate parallel to a line along a surface of the article, move said presser foot to engage the label, and to turn said picker plate to carry its edge adjacent the article past said surface of the article.

18. In a labeling apparatus, conveyor means to support and move articles along a predetermined path, a label magazine, a picker movable between said path and said magazine, means resiliently connected to said picker to move the latter, and means adjacent said conveyor means to hold the picker against movement when no article is present on the conveyor for labeling.

19. In a labeling apparatus, a presser foot, a wiper support, wiper arms pivoted on said support, bowed spring extending about the pivot of the arms to urge the arms together, and cooperating means on the arms and on said presser foot to spread the wiper arms.

20. In a labeling apparatus, a support, a picker carrier reciprocable on said support, a picker plate pivoted on said carrier, means to turn said picker plate with respect to said carrier during reciprocation of the latter and means reciprocable with said carrier to control pivotal movement of said plate.

21. In a labeling apparatus, a base, a carriage reciprocable on said base, label handling elements oscillatable on said carriage, means to reciprocate said carriage, and means movable in the plane of movement of said carriage for oscillating said label handling elements.

22. In a labeling apparatus, means to support and move articles in a predetermined path, a carriage movable along said path, a pair of picker elements mounted on said carriage and movable in a plane at an angle to said path, and a wiper device mounted for oscillation on said carriage in a plane parallel to and above said path.

23. In a labeling apparatus, means to support an article, a carriage, a picker support oscillatable on said carriage, a pair of picker plates pivoted on said picker support, a wiper device oscillatable on said carriage in a plane at right angles to the plane of oscillation of said picker support, and means to move said picker support to carry said picker plates to said article support, swing said picker plates on the picker support to spread the same and to move said wiper device between said picker plates.

24. In a labeling apparatus, means to support and move articles along a horizontal path, a carriage movable along said path, label applying elements carried by said carriage and movable laterally and vertically toward said path, and means to move said supporting means, carriage and label applying elements in synchronism.

25. In a labeling apparatus, continuously moving means to support and move articles along a predetermined path, a carriage reciprocable along said path, elements carried by said carriage movable laterally toward said path and adapted to cooperate to deliver and apply labels to articles, certain of said elements being movable vertically and other of said elements being movable horizontally, and means to move said supporting means, carriage and label applying elements in synchronism.

26. In a labeling apparatus, continuously moving means to support and move articles along a predetermined path, a carriage reciprocable along said path, elements carried by said carriage movable laterally toward said path and adapted to cooperate to deliver and apply labels to articles, certain of said elements being movable in one path and other of said elements being movable in a path approximately at right angles to the last-mentioned path, and means to move said supporting means, carriage and label applying elements in synchronism.

27. In a labeling apparatus, means to support and move articles in a predetermined path, an element reciprocable along said path, and a presser foot and wiper device mounted on said element for swinging movement in a plane parallel to the plane of said path.

28. In a labeling apparatus, means to support and move articles along a predetermined path, a carriage movable along said path, label applying elements mounted on said carriage and means to move said carriage and move said elements successively into contact with the article during a single movement of the carriage along said path.

29. In a labeling apparatus, means to support and move articles along a predetermined path, a carriage reciprocable along said path, label applying elements mounted on said carriage and means to move said carriage and move said elements successively into contact with the article during a single stroke of the carriage.

30. In a labeling apparatus, means to support and move articles along a predetermined path, a carriage reciprocable along said path, label applying elements mounted on said carriage and means to move said carriage and move said elements successively into contact with the article during a single stroke of the carriage, certain of said elements being movable vertically of the carriage and other of said elements being movable horizontally of the carriage.

31. In a labeling apparatus, means to support and move articles along a predetermined path, a carriage movable along said path, label applying elements carried by said carriage and movable laterally with respect to said carriage toward said path, and means to move said supporting means, carriage and label applying elements in synchronism.

32. In a labeling apparatus, means to support and move articles along a predetermined path, a carriage movable along said path, a label picker element, a label wiper element, a label presser, said three elements being carried by said carriage and movable toward the article path, and means to move said carriage and said elements substantially at the same linear speed as said supporting means at least while said elements are adjacent the article.

33. In a labeling apparatus, means to support and move articles along a predetermined path, a carriage movable along said path, a label picker element, a label wiper element, a label presser element, said elements being carried by said carriage and movable laterally with respect to said carriage toward said path, and means to move said supporting means, carriage and elements in synchronism.

34. In a labeling apparatus, means to support and move articles along a predetermined path, a carriage reciprocable along said path, label applying elements carried by said carriage and movable laterally with respect to said carriage toward said path, and means to move said supporting means, carriage and label applying elements in synchronism.

35. In a labeling apparatus, a support, a picker carrier reciprocable on said support, a picker plate pivoted on said carrier, a cam follower on said picker plate, a cam on said support engaged by said cam follower including a dwell into which said cam follower may move, a spring to urge said cam follower against said cam, and means slidable with said carrier to control swinging movement of the picker plate induced by said spring.

36. In a labeling apparatus, means to support and move articles along a predetermined path, a carriage reciprocable along said path, a picker element mounted on a pivot extending horizontally of said carriage, a wiper element and a presser element mounted on a pivot extending vertically of said carriage, and means to move said elements successively into contact with the article during a single stroke of the carriage.

PAUL R. POWELL.